B. E. DOHNER AND A. J. HUFF.
ROLLER BEARING.
APPLICATION FILED OCT. 29, 1917.

1,404,939.

Patented Jan. 31, 1922.

Witness
M. Siebler

Inventors
Bert E. Dohner
Albert J. Huff
By R. J. McCarty
their Attorney

UNITED STATES PATENT OFFICE.

BURT E. DOHNER AND ALBERT J. HUFF, OF DAYTON, OHIO.

ROLLER BEARING.

1,404,939. Specification of Letters Patent. Patented Jan. 31, 1922.

Application filed October 29, 1917. Serial No. 198,952.

*To all whom it may concern:*

Be it known that we, BURT E. DOHNER and ALBERT J. HUFF, citizens of the United States, residing at Dayton, in the county of Montgomery and State of Ohio, have invented certain new and useful Improvements in Roller Bearings, of which the following is a specification.

This invention relates to new and useful improvements in roller bearings.

Figure 1:
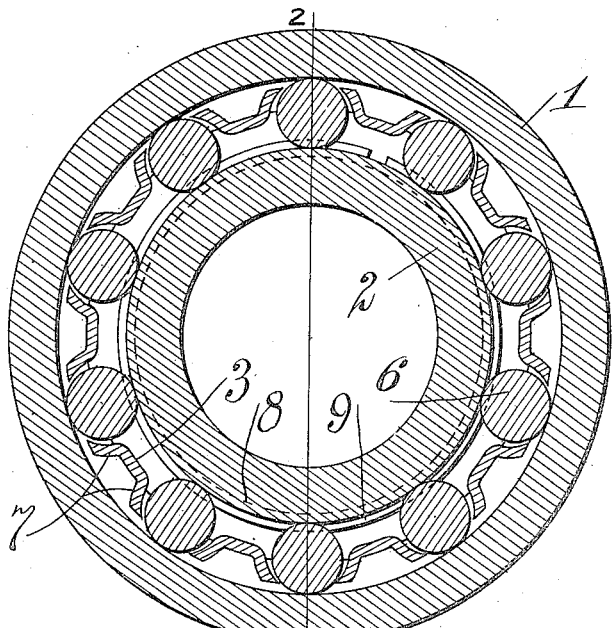
Figure 2:
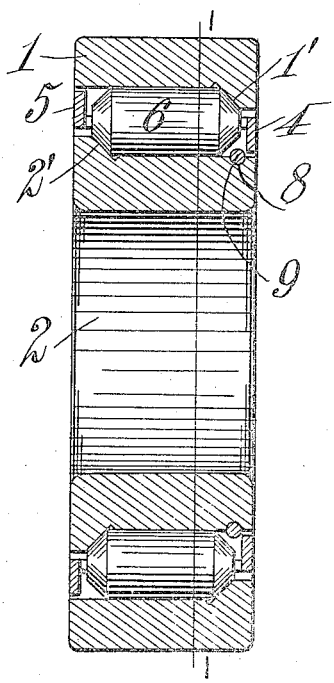
Figures 3, 5:
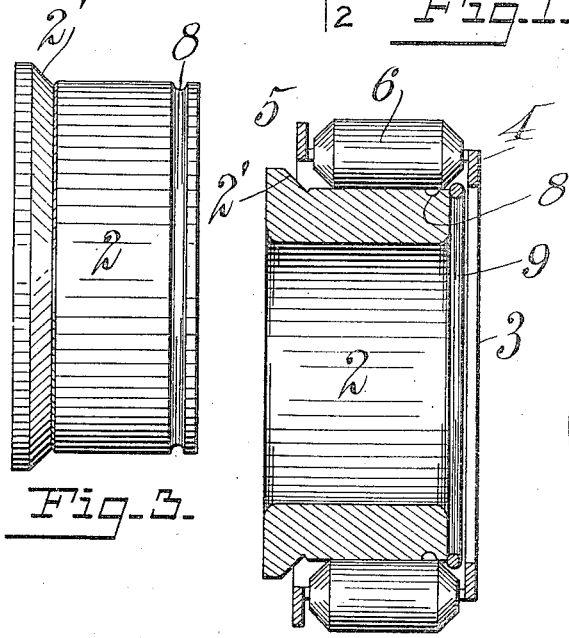
Figure 4:
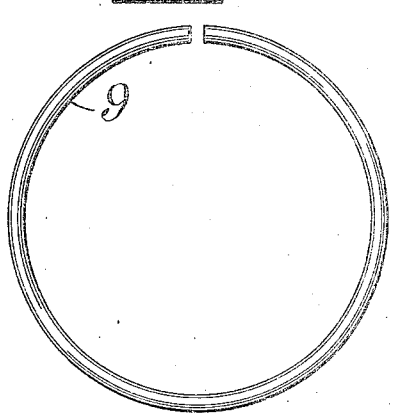

The object of the invention is to provide new and efficient means for preventing a separation of the roller cage from the inner shell or bearing member when these parts are assembled. A further object of the invention is to provide a roller cage so constituted that it will not come in contact with the inner and outer shells or bearing members and whereby friction is avoided which is more or less detrimental to roller bearings. Heretofore it has been a common practice to maintain the roller cage and the inner shell or bearing member together by means of lips which extend from the cage and over-lap an end of the inner shell or bearing member. This has been found disadvantageous owing to excessive friction and a liability to breakage of such parts of the cage. The present invention is designed to overcome these disadvantages and to this end the roller cage is so constructed that it is, as before stated, free from contact with the other parts of the bearing, towit, the inner and outer shells when the parts are assembled. A further object of the invention is to provide a roller bearing, the parts of which may be readily assembled and when assembled the cage is free to adjust itself to the rollers without any interference from other parts. A roller bearing having the means for accomplishing the above objects and purposes is illustrated in the accompanying drawings to which a general reference is now made. Of these drawings Fig. 1 is a sectional elevation of our improved roller bearing on line 1—1 of Fig. 2. Fig. 2 is a sectional elevation on line 2—2 of Fig. 1. Fig. 3 is a detail disconnected view of the inner shell or bearing member. Fig. 4 is a detail view of the retaining member of and Fig. 5 is a sectional elevation of the inner shell or bearing member, the cage and the retaining member shown in their relative positions when in the act of being assembled.

In a detail description of our improvements in roller bearing the same reference characters will indicate corresponding parts in the drawings.

Referring more particularly to the drawings, 1 and 2 respectively indicate the outer and inner shells or bearing members which have at opposite ends when these parts are assembled, tapered surfaces 1' and 2' respectively which match the tapered ends of the rollers 6 and receive the end thrusts of the rollers. The rollers 6 are assembled in a cage 3 of special construction. In cross section the said cage is of Z-shape which very materially strengthens the structure and enhances this utility in another respect presently to be referred to. The opposite ends of the cage are turned inwardly and outwardly to form flanges 4 and 5 which impart to the cage the shape referred to. The said cage is provided with the usual roller-retaining lips or flanges 7 which lie along the sides of the rollers and maintain said rollers in the cage when the outer shell or bearing member 1 is not assembled. It will be observed from Fig. 2 that when the parts are assembled there is a substantial clearance between the outwardly and inwardly turned ends of the roller cage and the inner and outer shells or bearing members. The inner shell or bearing member is provided with a groove 8 extending around its circumference at the small end thereof. This groove 8 receives the retaining member 9 and when the parts are assembled as in Fig. 2 the inner shell and the roller cage are maintained in such assembled position and against separation. The retaining member 9 is in the form of a resilient band or ring, the ends of which are disconnected. It is preferably of round form in cross section and when seated in the groove 8 about half of the diameter of said band lies beyond the adjacent surface of the inner shell or bearing member 2. It will be observed from Fig. 2 that when the retaining member 9 is in position it lies a sufficient distance from the adjacent ends of the rollers to be at all times free from contact therewith so that while providing efficient means to maintain the roller cage and the inner shell assembled the said retaining member is free from contact with any part of the cage or the rollers. The roller cage and inner shell are shown in Fig. 5 in the position they are in when about to be assembled. The retaining ring or member 9 is placed against the end of the inner shell and the roller cage is placed in position with the rollers engaging the inner shell but not wholly in position. With the parts so initially assembled the retaining member 9 is expanded by means of a suitable tool and is sprung over the end of the inner shell. The cage is then moved to its position as in Fig. 2 and in this movement the retainer 9 is moved into the groove 8 which completes the assembling of the parts.

While we have with some particularity described our improved roller bearing, we do not wish to be limited in the matter of unessential details but we desire to claim broadly means interposed between the outer periphery of the inner shell and the cage for maintaining said parts in their assembled condition, said means being free from frictional contact with the cage and the cage itself being free from frictional contact with the inner and outer bearing members.

Having described our invention we claim:

1. In a roller bearing, the combination of inner and outer shells, a series of rollers mounted between said shells, the inner shell having a circumferential groove at one side thereof, a resilient retainer ring adapted to be sprung into said groove, and a roller cage adapted to be placed over the inner shell at the end adjacent to said groove and to spring the retainer ring into position in said groove when the said cage is being assembled with the other parts of the bearing.

2. In a roller bearing, the combination of inner and outer cylindrical shells having oppositely disposed tapered bearing surfaces, a series of cylindrical rollers having their ends tapered and engaging said tapered bearing surfaces, the inner shell having a circumferential groove opposite the tapered bearing surface thereof, a resilient retainer ring adapted to be sprung into said groove, and a roller cage adapted to be placed over the inner shell at the end opposite the tapered surface of said inner shell and to spring the retainer ring into position in the groove when the said cage is being assembled with the other parts of the bearing.

In testimony whereof we affix our signatures.

BURT E. DOHNER.
ALBERT J. HUFF.